Dec. 3, 1968    K. G. KREUTER    3,414,231
ELECTRIC VALVE
Filed Feb. 17, 1964
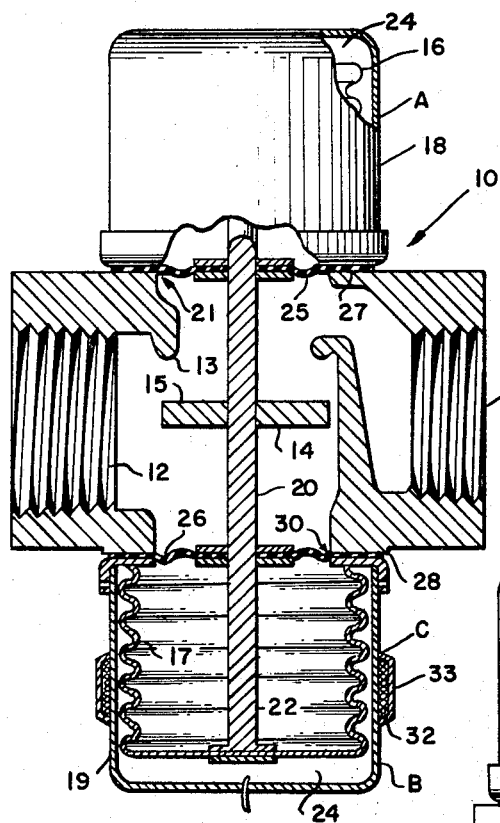
FIG.1.
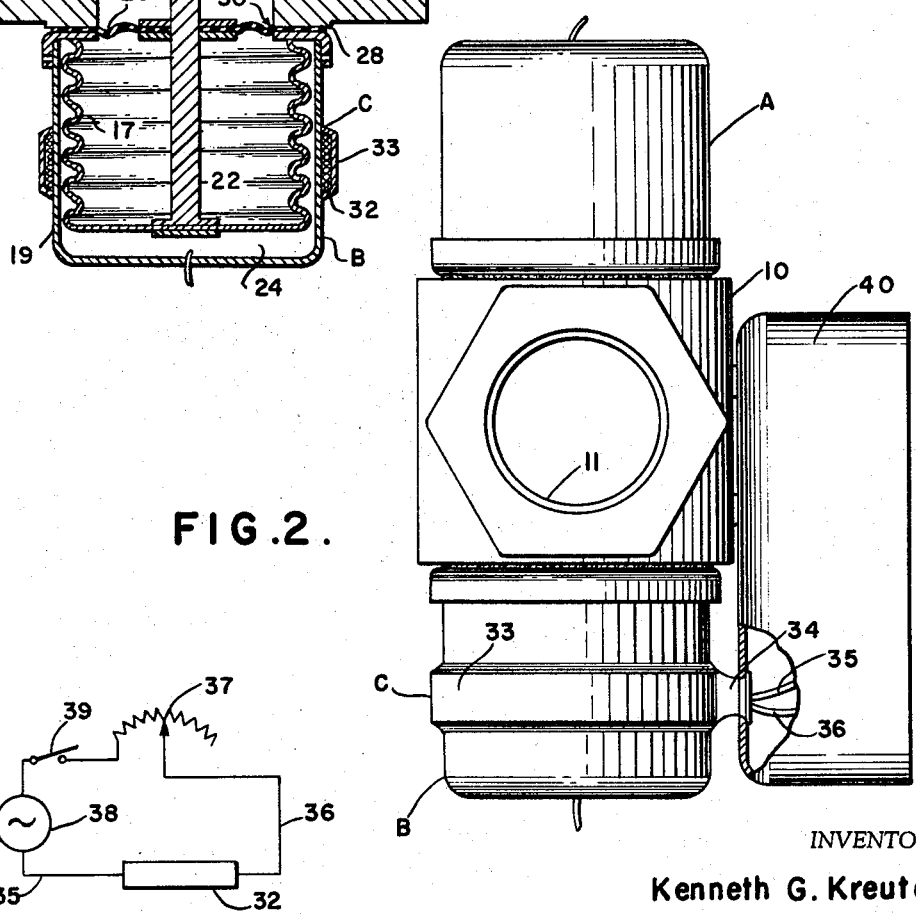
FIG.2.
FIG.3.
INVENTOR
Kenneth G. Kreuter
BY *Birch and O'Brien*
ATTORNEYS

United States Patent Office 3,414,231
Patented Dec. 3, 1968

3,414,231
ELECTRIC VALVE
Kenneth G. Kreuter, Goshen, Ind., assignor to Robertshaw Controls Company, Richmond, Va., a corporation of Delaware
Filed Feb. 17, 1964, Ser. No. 345,287
2 Claims. (Cl. 251—11)

The present invention relates generally to electrically operated thermostatic valves and more particularly to an ambient temperature compensated valve having electrically operated vapor motors to regulate the valve movement.

An object of this invention is to provide an electrothermostatic ambient compensating, friction-free, packless, fail-safe, modulating and proportional valve.

Another object is to provide an ambient temperature compensated friction free modulating or proportional-position action valve in a single moderate cost unit.

A further object is to provide an electric throttle valve with an operating heater means including a remote throttling range control means for regulating the throttling action of the valve.

Still another object is to provide an ambient temperature compensated valve adapted to be retained in a normally open attitude at deenergized operating positions by the bias action of two spaced deenergized vapor motor units connected to each side of the seating portion of the valve.

Still another object is to provide an electrothermostatic water valve or the like ambient temperature compensated to an equalized set open position adapted for modification from said temperature compensated set position in proportion to flow control regulation by an electrical remote control regulating means.

The above and other objects and advantages of the present invention will appear more fully hereinafter from a consideration of the detailed description which follows, taken with the accompanying drawing wherein a preferred embodiment of the invention is illustrated.

In the drawing, wherein like reference characters refer to like parts throughout the several views:

FIGURE 1 is an illustration of the present invention showing a valve body or housing partly in cross section and partly in front elevation view of the valve housing with the valve shown in ambient compensated open position;

FIGURE 2 is an elevation view of the valve body inlet side, the electrical control heater for the valve motor means and a control box partially cut away to show the electric leads to a suitable variable control means; and FIGURE 3 is a diagram of an electrical circuit loop with source to the valve motor control heater and to a suitable variable control means to the heater with a manual cut-out switch.

Referring in detail to the drawing and first with reference to FIGURE 1, there is shown a valve body 10 formed with an inlet 11 and an outlet 12 and an intermediate annular valve seat 13. The seat 13 cooperates with a valve 14. Said valve has a suitable seating surface 15 engageable with the annular valve seat 13 by means of vapor charged resilient bellows 16 and 17 in bellows housings 18 and 19 attached to opposite sides of the valve body 10 in the provision of vapor motors A and B.

The valve 14 is attached to the mid-point of valve stem 20 and the outer ends 21 and 22, respectively, of bellows 16 and 17 are suitably attached to each opposite end of the valve stem. Each of the effective areas of the diaphragms are equal to each other and to that of the valve 14. Also, each of the bellows housings are equal to each other and are larger than the exteriors of the interiorly nested bellows, so that equal vapor charged areas 24 are provided around the valve stem within the area of each bellows.

The bottom of each bellows housing is a flexible diaphragm seal 25 and 26, respectively. These diaphragm seals are secured between the peripheral edges 27 and 28 of each of the vertically aligned top and bottom openings 29 and 30 formed in the valve body 10. Upon assembling the valve body, 10, the bellows housings and bellows with the valve stem 20 and the valve 14 at the mid-point thereof, are arranged so that the valve is held in a normally open attitude by the spring force of the respective resilient bellows 16 and 17.

Also, because the vapor motors on each side of the valve body 10 are exposed to ambient temperature, the valve 14 is compensated for ambient temperature and remains set at the central valve open position, until moved by electrical heater unit C associated with one of the said vapor motors A or B.

As shown in FIGURE 1 the heater C comprises a resistance wire 32 protected by an annular shield 33 which taps off at hollow nipple 34 by leads 35 and 36 to a suitable control device, such as a rheostat device 37 and current source 38 and, if desired, a cut-out switch 39, see FIGURE 3.

The control device may be housed in electrical junction box 40, see FIGURE 2.

In operation with the valve assembled as hereinbefore explained, the valve is held normally open by the spring force of the spring resilient bellows 16 and 17 in each vapor motor. Then with fluid flowing through the valve body from inlet 11 to outlet 12, introduction of current from the control means and current source into the coil or resistance 32 will cause the resistance to heat. The heat from the coil induces expansion of the vapor charge in the bellows of the vapor motor encompassed by the coil, compressing one bellows and thereby forcing the valve stem 20 and valve 14 toward the annular valve seat 13, throttling off the flow through the valve body 10.

The proportional action position of the valve may be controlled by the regulation of the electrical current supplied to the resistance 32, thus the greater the current, the higher the heat and the greater the movement of the valve.

Thus by adjusting the arm of the rheostat of FIGURE 3, the greater the movement to control the throttling action of the valve 14 toward its seat 13.

Without further description it is believed that the advantages of the present invention over the prior art is apparent and while only one embodiment of the same is illustrated, it is to be expressly understood that the same is not limited thereto as various changes may be made in the combination and arrangement of the parts illustrated, as will now likely appear to others and those skilled in the art. For a definition of the scope or limits of the invention, reference should be had to the appended claims.

What is claimed is:

1. Ambient temperature compensated valve comprising a valve body with inlet and outlet ports, a valve seat defining a valve opening in the body between the ports, a valve stem extending through the valve opening, said valve stem having each end extending from each side of the valve body, a valve head mounted on the mid-portion of said valve stem below the valve seat, a vapor filled power unit connected on each end of the valve stem, said units being normally responsive only to ambient temperature, each unit including a spring acting bellows with the top connected to each respective end of the valve stem, each power unit being sealed from the controlled fluid in the valve body by a diaphragm having an effective fluid pressure area equal to that of the valve head and said power units being of equally charged capacity to compensate for ambient temperature variations, said bellows normally biasing said valve to open position away from said valve seat, and an electric heater means adjacent one of said vapor power units for expanding the vapor in said power unit, to thereby move said valve toward said seat.

2. An ambient temperature compensated valve comprising a valve body with inlet and outlet ports, a valve seat defining a valve opening in the body between the ports, a valve stem extending through the valve opening, said valve stem having each end extending from each side of the valve body, a valve head mounted on the mid-portion of said valve stem below the valve seat, a vapor filled power unit connected on each end of the valve stem, said units being normally responsive only to ambient temperature, each unit including a spring acting bellows with the top connected to each respective end of the valve stem, each power unit being sealed from the controlled fluid in the valve body by a diaphragm having an effective fluid pressure area equal to that of the valve head and said power units being of equally charged capacity to compensate for ambient temperature variations, said bellows normally biasing said valve to open position away from said valve seat, and an electric heater means adjacent one of said vapor power units for expanding the vapor in said power unit, to thereby move said valve toward said seat, and control means with a source of current for varying the amount of current supplied to said heater for regulating the throttling position of the valve with respect to said valve seat.

References Cited

UNITED STATES PATENTS

| | | | |
|---|---|---|---|
| 1,289,963 | 12/1918 | Thomson | 236—42 |
| 1,847,911 | 3/1932 | Trane | 236—42 |
| 1,988,776 | 1/1935 | Berghoefer | 236—99 |
| 2,285,913 | 6/1942 | Derrah | 236—68 |
| 2,365,650 | 12/1944 | Shaw et al. | 251—335.1 |

WILLIAM F. O'DEA, *Primary Examiner.*

R. GERARD, *Assistant Examiner.*